No. 680,151. Patented Aug. 6, 1901.
C. A. W. HULTMAN.
UNDERGROUND CONDUIT FOR ELECTRIC CONDUCTORS.
(Application filed Mar. 23, 1901.)
(No Model.) 2 Sheets—Sheet 1.
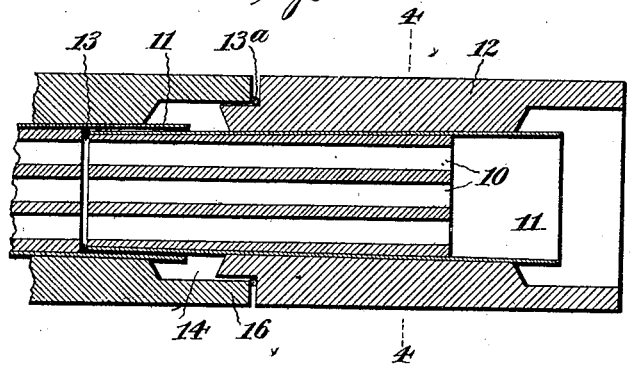
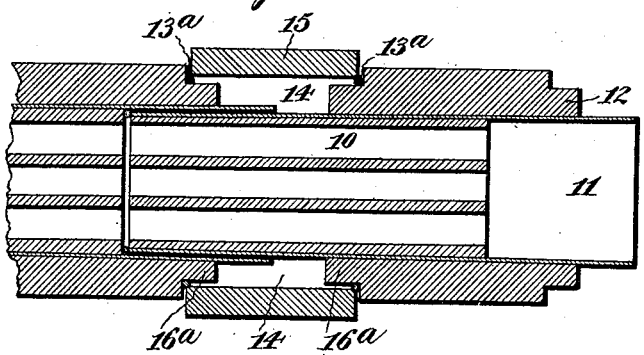
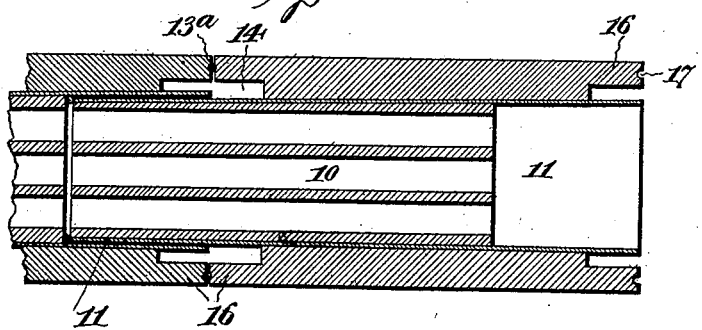
Witnesses:
Inventor,
Carl Axel Wilhelm Hultman No. 680,151. Patented Aug. 6, 1901.
C. A. W. HULTMAN.
UNDERGROUND CONDUIT FOR ELECTRIC CONDUCTORS.
(Application filed Mar. 23, 1901.)
(No Model.)
2 Sheets—Sheet 2.
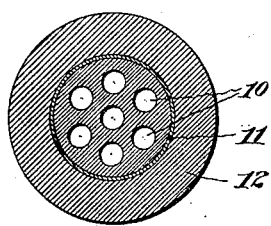
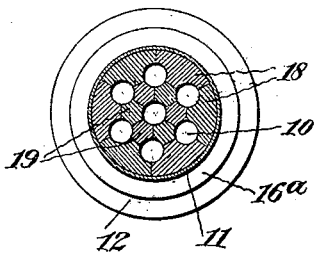
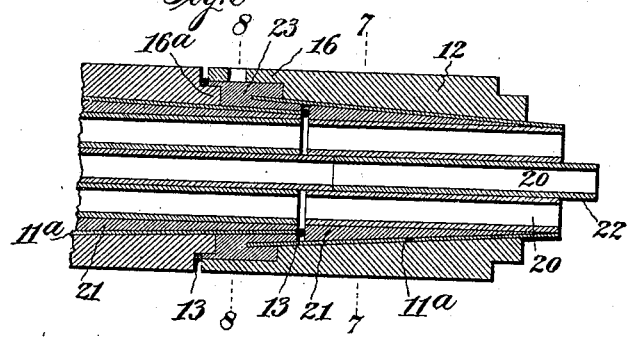
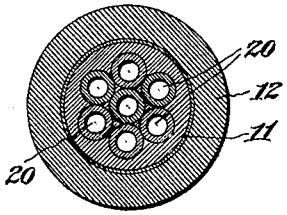
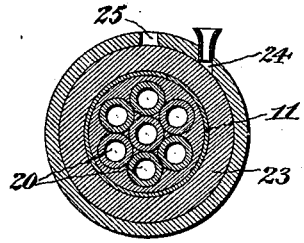
Witnesses:
B. T. Ober.
N. E. Beall.
Inventor,
Carl Axel Wilhelm Hultman,
by Henry Orth
Atty.
THE NORRIS PETERS CO., PHOTO-LITHO., WASHINGTON, D. C.

UNITED STATES PATENT OFFICE.

CARL A. W. HULTMAN, OF STOCKHOLM, SWEDEN.

UNDERGROUND CONDUIT FOR ELECTRIC CONDUCTORS.

SPECIFICATION forming part of Letters Patent No. 680,151, dated August 6, 1901.

Application filed March 23, 1901. Serial No. 52,543. (No model.)

*To all whom it may concern:*

Be it known that I, CARL AXEL WILHELM HULTMAN, a subject of the King of Sweden and Norway, residing at Stockholm, in the Kingdom of Sweden, have invented certain new and useful Improvements in Underground Conduits for Electric Conductors; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to underground conduits, and has for its object a novel construction of a sectional conduit for electric cable, telegraph-wires, and the like and to provide a water and gas tight conduit the sections of which are capable of yielding at their joints to a limited extent in order to adapt themselves to the settling of the ground in which they are placed.

Referring to the drawings, in which like parts are similarly designated, Figure 1 is a vertical longitudinal sectional view of one form of conduit. Fig. 2 is a similar form showing a conductive sleeve; Fig. 3, a like view showing butt-joints; Fig. 4, a cross-section on line 4 4 of Fig. 1; Fig. 5, a cross-section showing the built-up inner conduit; Fig. 6, a vertical longitudinal section showing interfitting ends; Fig. 7, a section on line 7 7 of Fig. 6, and Fig. 8 a section on line 8 8 of Fig. 6.

The inner or cable-carrying tubes 10 are made in one piece, as shown in Figs. 1, 2, 3, and 4, of terra-cotta, cement, artificial wood, or similar materials, are made of suitable lengths, and incased in an envelop or sheet-metal casing 11, one end of which preferably projects beyond the tubes or groups of tubes 10 and is made tapering from end to end or made larger or flaring, so that at the projecting portion the inner sections will have interfitting ends. These sections are then placed in terra-cotta conduits 12, molded or baked in a suitable form, whose ends are variously formed, so as to be put together to form a continuous conduit.

Between the inner sections of the sets of tubes 10 are placed suitable gaskets 13, which may be made of tarred rope, hemp, jute, or other suitable gasket material capable of forming a yielding water-tight joint. The terra-cotta conduits 12 at their abutting joints are provided with similar gaskets or packings 13$^a$, and the vacant space or pocket 14, formed between the suitably-shaped ends of these conduits 12 and the inner conduit, is then filled with cement or suitable filling material, thus making a yielding gas and water tight joint. This filling material may be composed of goudron dissolved in a suitable solvent, such as mineral oil, paraffin-oil, or equivalent material.

In Fig. 2 I have shown the exterior terra-cotta conduit 12 as provided with stepped ends, around which is placed a ring of similar material 15, the joints between said ring and terra-cotta sections being packed by a suitable packing 13$^a$, laid in the angle between the flanges 16$^a$ of the stepped ends.

In Fig. 3 I have shown the terra-cotta section provided with flanges 16, arranged to be alined to form an abutting joint provided with recesses 17 for the packing material. These flanges are formed flush with the exterior wall of the conduit 12 instead of with the interior wall, as shown in Fig. 2, the space between the flanges and the interior wall serving for the reception of the lute or flexible water-tight packing.

In lieu of forming the interior or tubular portion of the conduit in one piece of cement, terra-cotta, or similar material, as shown in section in Fig. 4, I may make this interior portion as built-up sections, as shown in Fig. 5. These conduit-sections are made of suitably-formed blocks of wood, artificial wood, or the like arranged to be placed together so as to provide through passages or tubes 10. As shown, these forms on the outer portion of the inner conduit-section are sector-shaped blocks 18, having cut-away portions at their corners that form the tube-spaces 10, while the inner blocks 19 are substantially triangular and also having cut-away corners for a like purpose. These sectional blocks may be surrounded with an envelop of sheet metal, tarred paper, sheet-celluloid, or similar waterproofing material, and this material may extend beyond one end of the inner conduit-section and be somewhat enlarged or flared, so as to form a socket for the reception of the end of the next adjoining section in a manner similar to the forms shown in Figs. 1, 2, and 3. I may also group a set of suitable pipes 20 together and hold them in place by a packing material or cement and surround the whole by waterproof envelop 11, which may be conical in form, so as to allow the end of the adjoining sections to interfit, or these ends may be flared or otherwise enlarged in order to accomplish the same result. In order to further interlock these sections, one or more of the pipes 20 may extend beyond the conduit-section proper, leaving an equal pocket at its opposite end for the reception of the projecting end or ends of the pipes of the adjoining section, such a construction being shown in Fig. 6.

The pipes 20 are placed in a conical water and gas proof envelop 11$^a$ and held in place by cement or similar material 21, so as to make a rigid inner conduit-section, one of the pipes here shown for an example as a central one of a group of seven, all of which are of substantially the same length, has one end, as shown at 22, projecting beyond the remaining tubes, leaving the pocket at its opposite end for the reception of the projecting end of the tube of the adjoining section. These tubes, with their envelops 11$^a$, form a rigid conduit-section arranged to be interfitted at their ends, packed with the packing-ring 13, and are inserted in a suitable tubular terra-cotta sectional conduit 12, also arranged to have interfitting ends, between which the packing-ring 13$^a$ is placed and the pocket filled with a suitable lute 23. The method of filling this pocket with such a lute may be such as exigencies of construction would require; but in Fig. 8 I have shown a method of filling this pocket. Holes are formed in the flange of the overlapping terra-cotta section 12, one of which, 24, is for the reception of a funnel, through which the lute 23 is poured, and when the vent-hole 25 appears full the joining of two adjacent sections will be complete.

It is of course obvious that I may omit the terra-cotta conduit-sections 12 and simply lay the inner conduit-sections, which contain the cable-carrying tubes 10 20, in a bed of cement. The sections so joined will be flexible at their joints and readily give and conform to the settlement of the ground in which they are laid, thus preventing the deleterious and destroying influence of water and gas that pass through cracks in the conduit and corrode the cables or wires.

Having thus described my invention, what I claim as new therein, and desire to secure by Letters Patent, is—

1. A conduit for electric conductors comprising sections arranged end to end and having one or more passages for a conductor or conductors and a waterproof sheathing for each of said sections constructed to telescope onto the sheathing of an adjacent section, for the purpose set forth.

2. A conduit for electric conductors comprising sections arranged end to end and having one or more passages for a conductor or conductors, one or more of said passages projecting from one end of a section and telescoping into the corresponding passage or passages of an adjacent section, and a waterproof sheathing for each of said sections constructed to telescope onto an adjacent section, for the purpose set forth.

3. A conduit for electric conductors comprising sections arranged end to end and having one or more passages for a conductor or conductors, a waterproof sheathing for each of said sections of greater length than the latter and having its portion projecting from one end made outwardly flaring and telescoping onto the sheathing of an adjacent section, for the purpose set forth.

4. A conduit for electric conductors comprising sections arranged end to end and having one or more passages for a conductor or conductors, and a sheathing for each of said sections constructed to telescope onto an adjacent section; in combination with an inclosing structure made of sections of less length than the conduit-sections and arranged about the same to leave a gap at the telescopic connection beween the conduit-sections, a waterproof luting filling said gaps and the telescopic joints, and a bridge bridging the gap between the sections of the inclosing structure, for the purpose set forth.

5. A sectional conduit for electric conductors, comprising conduit-sections and telescopically interfitting sheaths inclosing said sections, for the purpose set forth.

6. A conduit for electric conductors comprising sections arranged end to end and having one or more passages for a conductor or conductors, and a sheathing for each of said sections constructed to telescope onto an adjacent section; in combination with an inclosing structure made of sections of less length than the conduit-sections and arranged about the same to leave a gap at the telescopic connection between the conduit-sections, a waterproof more or less flexible or elastic luting filling said gaps and the telescopic joints, and a bridge bridging the gap between the sections of the inclosing structure, for the purpose set forth.

7. A conduit for electric conductors comprising sections arranged end to end and having one or more passages for a conductor or conductors, and a waterproof sheathing of a more or less flexible material for each of said sections constructed to telescope onto the sheathing of an adjacent section, for the purposes set forth.

In testimony that I claim the foregoing as my invention I have signed my name in presence of two subscribing witnesses.

CARL A. W. HULTMAN.

Witnesses:
PHILIP F. LARNER,
HENRY ORTH, Jr.